Figure 1:
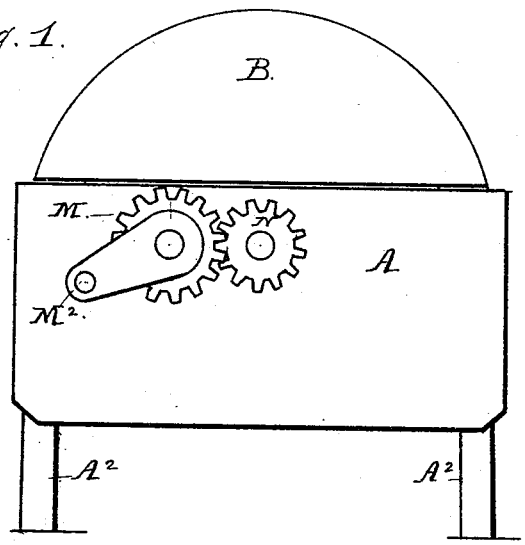

(No Model.)

W. WERFIELD.
CHURN.

No. 277,091. Patented May 8, 1883.

WITNESSES
Morton Toulmin
H. J. Hayden

INVENTOR
William Werfield
N. W. Fitzgerald &c
Attorney

UNITED STATES PATENT OFFICE.

WILLIAM WERFIELD, OF AURORA, NEBRASKA.

CHURN.

SPECIFICATION forming part of Letters Patent No. 277,091, dated May 8, 1883.

Application filed November 3, 1882. (No model.)

*To all whom it may concern:*

Be it known that I, WILLIAM WERFIELD, a citizen of the United States, residing at Aurora, in the county of Hamilton and State of Nebraska, have invented certain new and useful Improvements in Churns; and I do hereby declare the following to be a full, clear, and exact description of the invention, such as will enable others skilled in the art to which it appertains to make and use the same.

This invention relates to improvements in rotary churns, and has for its object the construction of a cheap and efficient device for the purpose, as shown in the drawings forming part of this specification, in which—

Figure 2:
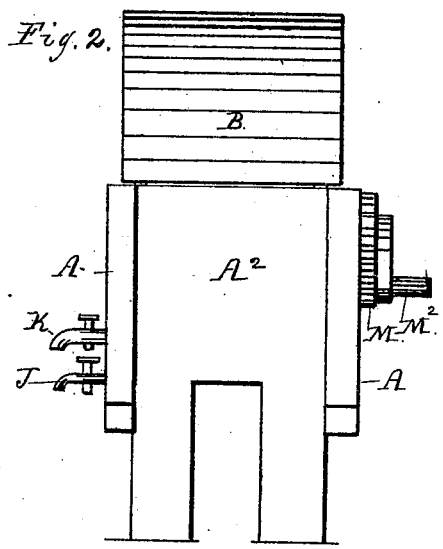
Figure 3:
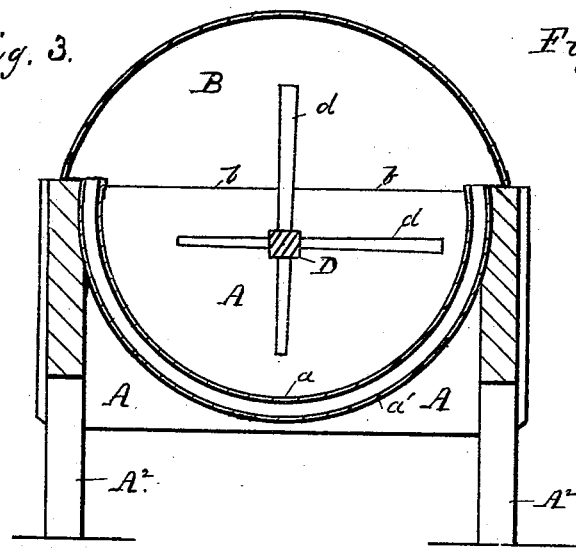
Figure 4:
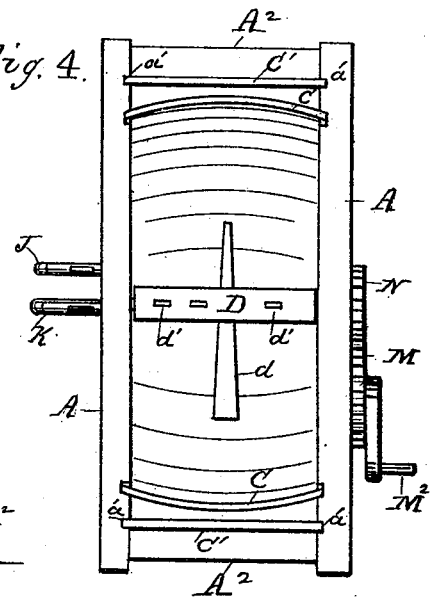

Figure 1 is a side elevation. Fig. 2 is an end elevation. Fig. 3 is a side elevation, partly in section. Fig. 4 is a plan view.

The sides A of the body of the churn are formed of two pieces of board of sufficient thickness to permit of there being cut on the inner sides thereof two semicircular grooves, $a$ $a'$. The ends of the churn are formed of two pieces of board, $A^2$, cut at the bottom so as to form legs to support the device the proper distance from the floor. The sides A are attached to the end piece, $A^2$, in any convenient manner, either by nails or screws. Two pieces of thin wood or metal, $c$ $c'$, are bent into a semicircular shape, and the ends are inserted in the grooves $a$ $a'$, so that when the sides A are fastened to the end pieces, $A^2$, and drawn closely to each other two water-tight vessels will be formed, the upper one for the reception of the milk and cream and the lower one for cold or hot water. A semicircular cover, B, fits over the top of the churn, and is furnished with strips $b$ on the inside, which fit on the inner part of the milk and cream vessel in such manner that any particles of milk or cream thrown up by the dashers $d$ will drip back into the upper vessel of the churn. The shaft D is provided on one end with a pinion or pulley, N. The shaft D is intended to be provided with metal bearings in the sides of the churn A. A spur-wheel, M, having crank-handle $M^2$, meshes into the pinion N and gives rotary motion to the shaft D when the handle $M^2$ is turned. The shaft D is mortised with elongated openings $d'$, placed at right angles to each other, and the dashers $d$ are inserted therein.

The dashers $d$ are made of a tapering form, in order that they may be driven into the openings $d'$, and be held firmly in their respective places, and the taper enables them to be more easily removed when it is desired to clean them, or for any other purpose.

The piece of wood $c$, forming the bottom of the upper vessel, is made of barrel-shape, for the reason that a tighter joint can be made when of this shape when it is placed in the channels $a$ and the sides A are brought toward each other and secured to the ends $A^2$. A spigot, K, is placed on one side of the churn, in order to draw off the buttermilk from the upper vessel, and another, J, is placed a little below and on one side of K, in order to draw off the water in the lower vessel. The water is intended to regulate the temperature of the milk and cream according to the state of the weather when the churn is used.

I am aware that the following patents have been granted, viz: No. 194,650, to Cline and Gallagher, August 28, 1877; No. 216,466, Sprague, June 10, 1879; No. 1,648, Crowell, June 20, 1840, and No. 125,660, Carmack, April 16, 1872. I do not claim the construction or any of the features shown in these; but What I do desire to secure by Letters Patent and to claim is—

In a rotary churn, the combination of sides A, having channels $a$ $a'$ and bottom pieces, $c$ $c'$, the piece $c$ having a curved transverse section, as shown and described, and for the purposes set forth.

In testimony whereof I affix my signature in presence of two witnesses.

WILLIAM WERFIELD.

Witnesses:
 DELEVAN BATES,
 JOHN TWEEDY.